C. H. NORTON.
REVERSING MECHANISM.
APPLICATION FILED MAY 4, 1918.
1,385,970.
Patented July 26, 1921.
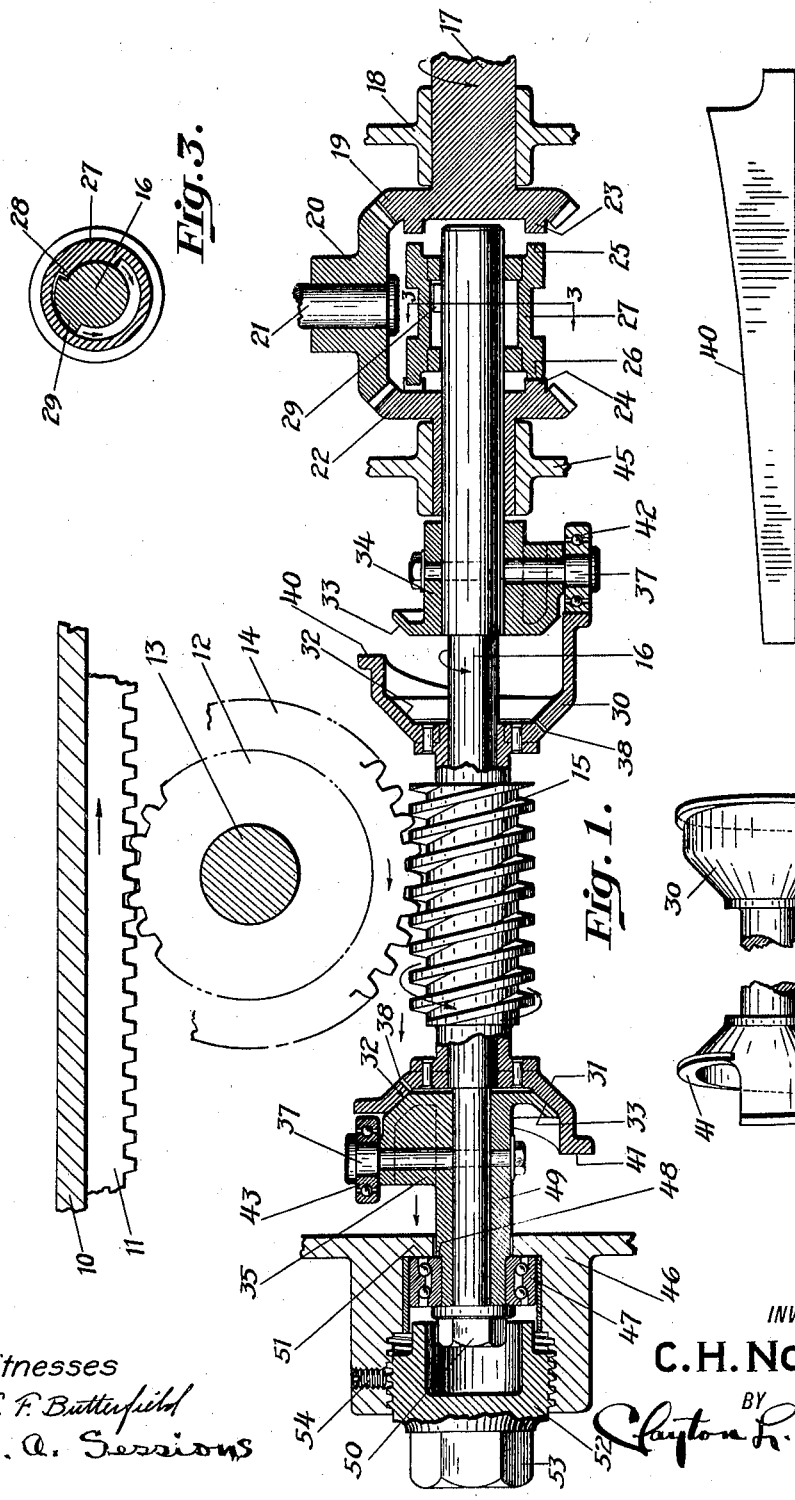
Witnesses
L. F. Butterfield
L. A. Sessions
INVENTOR
C. H. NORTON
BY
Clayton L. Jenks
ATTORNEY

UNITED STATES PATENT OFFICE.

CHARLES H. NORTON, OF WORCESTER, MASSACHUSETTS, ASSIGNOR TO NORTON COMPANY, OF WORCESTER, MASSACHUSETTS, A CORPORATION OF MASSACHUSETTS.

REVERSING MECHANISM.

1,385,970.   Specification of Letters Patent.   Patented July 26, 1921.

Application filed May 4, 1918. Serial No. 232,599.

*To all whom it may concern:*

Be it known that I, CHARLES H. NORTON, a citizen of the United States of America, residing at Worcester, in the county of Worcester and State of Massachusetts, have invented certain new and useful Improvements in Reversing Mechanisms, of which the following is a full, clear, and exact specification.

My invention relates to a reversing mechanism of the type disclosed in the patents to myself No. 1191987, patented July 25, 1916, and No. 1261158, patented April 2, 1918, which involve a device for starting a heavy, reciprocatory body gradually from rest to its full speed and thereafter driving it at a normal rate.

If a heavy object, such as a grinding machine table, is reciprocated periodically by means of the reversing mechanism covered by my patents, there is a tendency for the load to continue movement in its original direction after the clutch has been thrown, and this may result in a noticeable shock if the table is being moved at any considerable speed. It is accordingly an object of my invention to provide a reversing mechanism for gradually starting a heavy, reciprocatory body from rest to a normal rate and then permit it to continue moving under its own momentum after the clutch has been thrown for a reverse drive, and thereby to eliminate the shocks incident both to starting and to stopping the body and as a result permit moving the load more rapidly than heretofore feasible.

With this and other objects in view as will be apparent from the following disclosure, my invention resides in the combination of parts set forth in the specification and covered by the claims appended hereto.

In the drawings, in which like reference numerals indicate like parts:

Figure 1 is a sectional elevation taken through the driving shaft of the mechanism;

Fig. 2 is a detail showing the driving cam members in perspective view;

Fig. 3 is a section on the line 3—3 of Fig. 1; and

Fig. 4 is a development of the driving cam.

As one specific embodiment of my invention, I have illustrated in the drawings a construction applicable to a grinding machine, in which the work-carrying table 10 is reciprocated by a rack bar 11 thereon meshing with a gear wheel 12 on a shaft 13 which carries a further gear wheel 14 driven by a worm 15. The worm 15 is slidably and rotatably mounted upon the shaft 16 and is rotated by a driving mechanism similar to that described in my Patent No. 1261158. The shaft 16 is in turn driven by any suitable clutch mechanism, which may comprise, as illustrated, a lost motion connection therein.

This form of clutch drive involves a power shaft 17 mounted in suitable bearings 18 and carrying a bevel gear 19 which meshes with another bevel gear 20 suitably mounted on spindle 21. This gear wheel 20 in turn meshes with the bevel gear 22 rotatably mounted on the shaft 16. Clutch teeth 23 and 24 on the bevel gears 19 and 22 are adapted to mesh with similar clutch teeth 25 and 26 on a reciprocatable clutch member 27 keyed to the shaft 16. This member 27 is adapted to be moved by any suitable means, which forms no part of my invention.

If it is desired to provide means for allowing the shaft 16 to continue rotation for a short time after the clutch has been reversed, I may provide a lost motion connection between the shaft 16 and the clutch member 27, comprising, for example, a tooth 28 on the clutch member engageable with another tooth 29 on the shaft, these being of such width that the shaft or the clutch member may be rotated through any predetermined part of a circle before the teeth come into engagement. The tooth 29 is furthermore made shorter than the tooth 28 to permit relative longitudinal movement of shaft 16 and clutch member 27.

The driving mechanism herein illustrated comprises driving cam members 30 and 31 mounted on the opposite ends of the worm member 15. Each cam member is made hollow and provided with a concave driving surface 32 adapted to be frictionally engaged by a coöperating convex surface 33 on one of the driving members 34 and 35. The latter are fixed to the shaft 16, as by means of bolts 37 passing therethrough. The mechanism is adapted to run in oil and the friction driving parts are formed, as illustrated, like a dash pot to lessen the shocks of operation, oil holes 38 being provided in the driving cam members, through which the oil may be forced when the two conical surfaces are brought together into frictional driving engagement.

In the mechanism so far described, I have provided means for rotating the worm 15 and thereby reciprocating the table 10. In order that the table 10 may be started gradually, I utilize the construction described in my previous patents, involving means for reciprocating the worm 15 like a rack bar at a gradually increasing rate, and thus moving the gear wheel 14 and the table 10 at a correspondingly increasing rate until full speed is attained, whereafter the worm 15 is rotated and caused to act normally as a driving worm. To this end, I provide the driving members 30 and 31 with cam surfaces 40 and 41, which may be substantially alike but arranged in reverse positions. Ball bearing rollers 42 and 43 are rotatably mounted on the pins 37 of the drivers and are adapted to be constantly in engagement with the adjacent cam surfaces 40 and 41.

As illustrated in Fig. 4, showing a development of a cam surface, each cam path is so shaped that a roller starting at the lower end of the cam path and moving up it with a constant longitudinal motion is given an increasing vertical motion, until the top of the path is reached. In other words, a constant circumferential movement of the roller causes an accelerated axial motion of the worm. This curve may follow the law of falling bodies. By means of this arrangement, when the shaft 16 is rotated one of the rollers travels up the cam path from its lowest to its highest position and thereby brings the friction surfaces on the driving members at the other end of the worm into engagement. During the travel of the roller up the cam path, the worm 15 is not being rotated because the driving friction surfaces are not in engagement, but it is being moved longitudinally of its axis, with the result that the gear wheel 14 is turned as if by a rack bar, the shape of the cam path being such that the wheel 14 attains the normal full speed by the time the friction surfaces come into engagement. After this, the worm 15 is brought into rotation at full speed and the table is kept going by a normal worm driving operation.

Since the massive table 10 and the driving mechanism have considerable inertia and tend to continue movement after the clutch has been thrown, I provide a construction which permits the table to slide under its own momentum and if the worm and gearing come to rest first to drive the worm like a rack bar until friction has brought the parts to rest. Accordingly, the device is made so that the shaft 16 may slide longitudinally through its bearings 45 and 46 for a slight distance. To take up the end thrust on the shaft 16 and to permit this sliding movement, I provide the construction shown at the left-hand end of Fig. 1. In the present embodiment, a thrust ball bearing 47 is mounted on the end of shaft 16 against a shoulder 48 on an extension 49 of the driving member 35, and is held in place thereagainst by a nut and washer 50 on the threaded end of the shaft. The thrust toward the right is accordingly taken up on the annular shoulder 51 of the bearing support 46. The thrust in the opposite direction is taken up by a member 52, which is adjustably screw-threaded into the support 46 and may be turned to any desired position by a wrench applied to the head 53 and locked therein by the set screw 54.

The operation of my mechanism is considered obvious from the above disclosure. The view shown in Fig. 1 is that representing the mechanism as driven normally by the rotating worm in the direction of the arrows, and after the clutch has been thrown for a reverse motion and the driving shaft 16 is about to slide to the left under the continuing motion of the table 10. At this period in the operation of the mechanism, the worm and the friction driving members of shaft 16 may continue to rotate under their own momentum for a short time while the table slides, causing the worm to thread through the worm gear teeth. The worm and its associated parts stop before the table, whereupon the latter exerts a driving force on the worm. The lead of the worm is such that the reaction due to the continuing motion of the table results in a longitudinal movement of the worm as a rack bar and thus forces the thrust ball bearings against the member 52. The distance through which the shaft 16 may slide is adjusted in accordance with the speed of the table so that the latter may come to rest just as the thrust members come into engagement. The parts are then ready for a reverse operation involving starting the table gradually in the opposite direction.

While the lost motion connection may be omitted from this mechanism due to the fact that the device cannot start in an opposite direction until the thrust members have been brought into engagement, which takes place while the table slides under its own momentum, I prefer to employ the construction illustrated. Accordingly, the clutch teeth 28 and 29 must revolve toward each other while shaft 16 is sliding axially. When they have come into engagement, the thrust is toward the left and in the proper direction for starting the table in the opposite direction. Thereafter the roller 43 begins to climb up the cam path 41 on the member 31, and to move the worm 15 toward the right to start the load and repeat the cycle.

By the construction illustrated I have provided a reversing mechanism which may bring a massive load into motion gradually, and which permits this load to continue in its forward movement after the power has been reversed and to come to rest gradually without material shock, after which it may be started easily in the opposite direction.

I claim as my invention:

1. A reversing mechanism comprising a rotatable driving worm, a worm gear and load driven by the worm, reversing driving means for the worm, means to move the worm axially at an increasing rate to start the load gradually and thereafter to rotate the worm at a normal rate for an indeterminate period and means whereby the load may come gradually to rest under its own momentum without material shock at each reversal.

2. A reversing mechanism comprising a rotatable reversing driving worm, a worm gear and load driven by the worm, driving means for the worm, means to move the worm axially at an increasing rate and to rotate it to start the load gradually and means whereby the load may move the worm axially and come gradually to rest under its own momentum without material shock.

3. A reversing mechanism comprising a shaft, a rotatable worm thereon, a worm wheel and load driven thereby, driving means to move the worm axially and to rotate it for starting the load gradually and means, serving when the direction of rotation is reversed, whereby the load may move the worm and shaft axially as it comes gradually to rest and permit an easy start thereafter.

4. In a reversing mechanism, an axially movable shaft, a rotatable worm axially movable on the shaft, a worm gear and load driven by the worm, cam driving means to move the worm axially at an increasing rate and rotate it to start the load gradually, and means permitting longitudinal movement of shaft and worm under the driving action of the worm gear while the parts come to rest.

5. In a reversing mechanism, a driving shaft, a worm gear constituting a driven load, a rotatable, axially movable worm on the shaft adapted to coöperate with the gear either as a non-rotating rack bar or as a normally rotating worm, a mechanism driven by the shaft and adapted to slide the worm axially at a gradually increasing rate, means to rotate the worm normally and bearings for said shaft permitting longitudinal movement of the shaft and worm when the latter is driven as a rack bar by the load.

6. A reversing mechanism comprising an axially slidable, rotatable shaft, bearings therefor permitting such movement, a rotatable worm slidably mounted on the shaft, a worm wheel and load driven by the worm, a cam driver revolved by the shaft, means actuated by the driver to slide the worm axially and start the load gradually, means rendered operative by sliding the worm to revolve the latter at a normal rate and means adapted to permit the load to continue in its forward motion after the power has been released, said worm and shaft moving axially under the driving action of the worm wheel.

7. A reversing mechanism comprising a driving and reversing clutch, an axially movable, rotatable worm, a worm gear and load driven thereby, cam driving means to move the worm axiallly at an increasing rate, longitudinally movable driving means to rotate the worm normally after such axial movement, and thrust bearing supports for the driving means permitting longitudinal movement of the driving means and worm as the latter is moved axially by the worm gear when the clutch has been reversed and the load is coming to rest.

8. A reversing mechanism having, in combination, a driving shaft, means for rotating the shaft in opposite directions, an axially movable, rotatable worm on the shaft, a worm gear and load driven by the worm, cam means to move the worm axially at a gradually increasing rate, driving means to rotate the worm normally after such axial movement, comprising cushioning clutch members, one being fixed to the shaft and the other connected with the worm, and bearings including thrust members for said shaft permitting longitudinal movement of the driving means and worm when the direction of rotation is reversed and the load is coming to rest.

Signed at Worcester, Massachusetts, this 30th day of April 1918.

CHARLES H. NORTON.